(12) United States Patent
Hole et al.

(10) Patent No.: US 8,477,744 B2
(45) Date of Patent: Jul. 2, 2013

(54) SYSTEM AND METHOD FOR ENTERING DYNAMIC TIMESLOT REDUCTION

(75) Inventors: David Phillip Hole, Southampton (GB); Werner Kreuzer, Baiern (DE)

(73) Assignee: Research In Motion Limited, Waterloo, Ontario (CA)

( * ) Notice: Subject to any disclaimer, the term of this patent is extended or adjusted under 35 U.S.C. 154(b) by 268 days.

(21) Appl. No.: 12/862,622

(22) Filed: Aug. 24, 2010

(65) Prior Publication Data
US 2012/0051333 A1    Mar. 1, 2012

(51) Int. Cl.
*H04J 3/00*    (2006.01)
(52) U.S. Cl.
USPC .......................................... 370/336
(58) Field of Classification Search
USPC ............... 370/241, 252, 310, 315, 316, 319, 370/321, 322, 328, 329, 336, 345, 347, 348, 370/431, 442, 443, 464, 478; 455/403, 422.1, 455/450, 452.1
See application file for complete search history.

(56) References Cited

U.S. PATENT DOCUMENTS
6,157,632 A    12/2000  Cudak et al.
2006/0199603 A1*  9/2006  Hart et al. .................... 455/522
2007/0133605 A1*  6/2007  Herrmann .................... 370/473
2008/0081554 A1*  4/2008  Suh et al. ........................ 455/8
2010/0210275 A1*  8/2010  Navratil et al. ............... 455/450
2010/0278105 A1* 11/2010  Diachina et al. .............. 370/328

FOREIGN PATENT DOCUMENTS
EP    1229748 A1    8/2002
WO  2006130741 A1   12/2006

OTHER PUBLICATIONS

PCT International Search Report and Written Opinion, PCT/EP2011/064577, Nov. 7, 2011.
Nokia Corporation, Nokia Siemens Networks, Dynamic Timeslot Reduction, 3GPP TSG GERAN#41, Tdoc G2-090266, Valetta, Malta, Feb. 16-20, 2009.

* cited by examiner

*Primary Examiner* — Obaidul Huq
(74) *Attorney, Agent, or Firm* — Quarles & Brady LLP

(57) ABSTRACT

A method for communicating with a network is presented. The method includes receiving an assignment of first timeslots for uplink communications, and receiving a first data block having a first block sequence number and including an instruction to reduce monitoring to a set of timeslots. The set of timeslots has a number of timeslots less than a number of timeslots to be monitored in accordance with the assignment. The method includes determining that at least one second data block having a second block sequence number that is less than the first block sequence number was not successfully received from the network, reducing a number of timeslots monitored to the set of timeslots, and receiving a retransmission of the at least one second data block from the network using a timeslot in the set of timeslots.

18 Claims, 8 Drawing Sheets

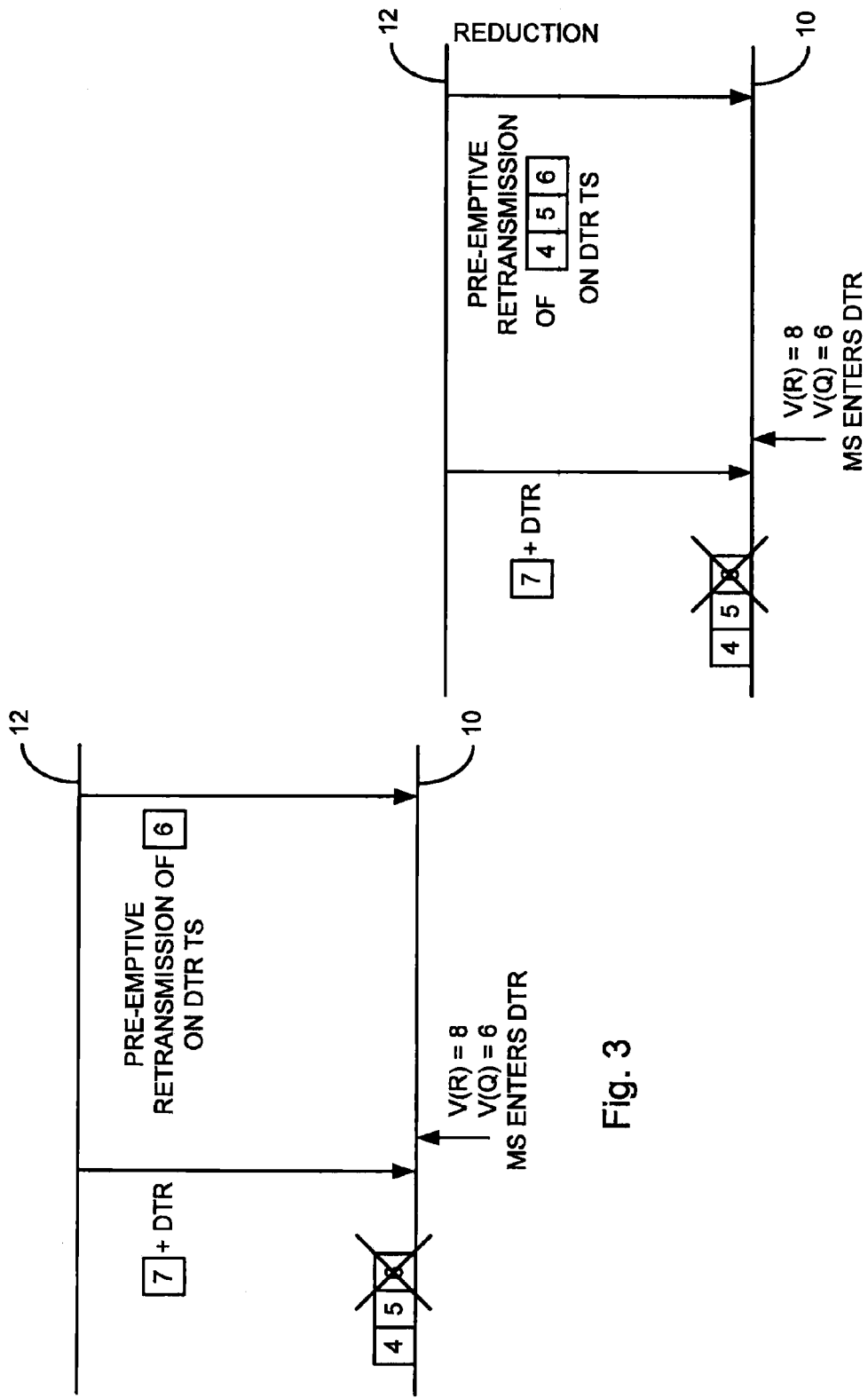

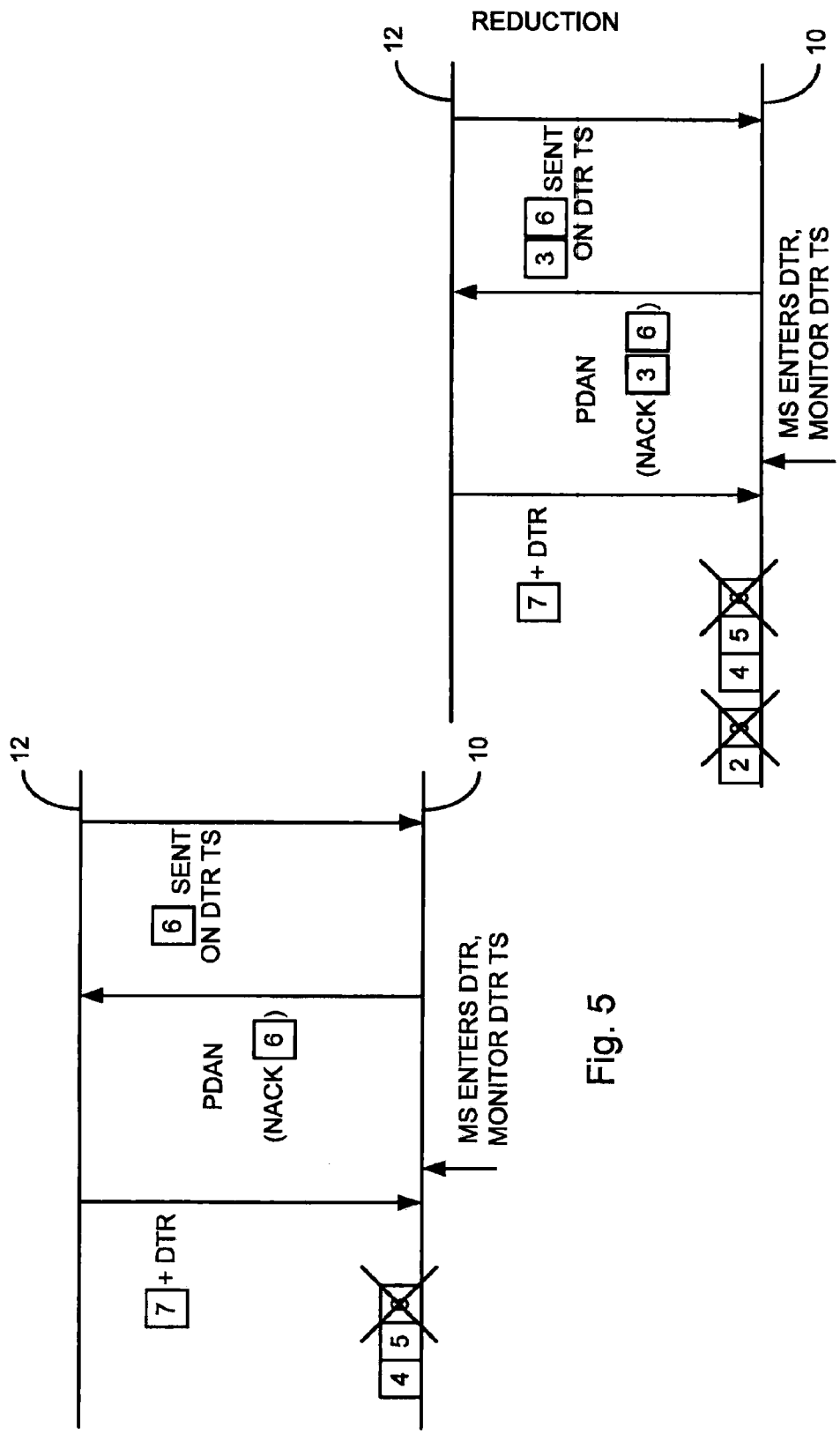

SYSTEM AND METHOD FOR ENTERING DYNAMIC TIMESLOT REDUCTION

BACKGROUND

The present disclosure relates generally to data transmission protocols in mobile communication systems and, more specifically, to systems and methods for controlling dynamic timeslot reduction (DTR) in a communication system during instances when data blocks may potentially be lost or incompletely transmitted.

As used herein, the terms "mobile station" (MS), "user agent," and "user equipment" (UE) can refer to electronic devices such as mobile telephones, personal digital assistants (PDAs), handheld or laptop computers, and similar devices that have network communications capabilities. In some configurations, MS may refer to a mobile, wireless device. The terms may also refer to devices that have similar capabilities but that are not readily transportable, such as desktop computers, set-top boxes, or network nodes.

An MS may operate in a wireless communication network that provides for data communications. For example, the MS may operate in accordance with Global System for Mobile Communications (GSM) and General Packet Radio Service (GPRS) technologies. Today, such an MS may further operate in accordance with Enhanced Data rates for GSM Evolution (EDGE), Enhanced GPRS (EGPRS), Enhanced GPRS Phase 2 (EGPRS2), or GSM EDGE Radio Access Network (GERAN).

To communicate with a network, an MS is configured to use a media access control (MAC) protocol to determine the uplink (UL) and/or downlink (DL) communication resources available for use by the MS. GPRS, for example, uses a timeslot structure similar to that of GSM, but where timeslots are dynamically allocated to MSs both for uplink and downlink transmissions. To communicate with a GPRS network, therefore, an MS may be configured to have a multi-slot capability that enables the MS to use between one (1) and eight (8) timeslots per carrier for data transfer between the MS and network. Because uplink and downlink channels are reserved separately, various multi-slot resource configurations may be assigned in different directions in different communications networks.

In some cases, an MS may be allocated timeslots on dual carriers. A dual carrier 'assignment' comprises a set of timeslots assigned on two carriers. In the case of an uplink dual carrier assignment, the assignment includes the total set of timeslots on both carriers that may be used by the MS for uplink transmissions; in the case of a downlink dual carrier assignment, the assignment is the total set of timeslots on both carriers upon which the network may send data to the MS.

For any given radio block period, the network dynamically allocates resources and determines upon which downlink timeslots or uplink timeslots the MS may receive and/or transmit data. In basic transmission time intervals (BTTI), a given radio block period can include 4 TDMA frames with each TDMA frame including 8 timeslots. The allocation algorithm may be implementation dependent, but may take account of the MS's multislot class (the maximum number of timeslots on which the MS can transmit or receive, and the time required to switch from transmit to receive and vice versa), and may take account of the amount of data the network (e.g., a base station controller (BSC)) expects the MS to receive or transmit.

In some cases, reduced transmission time intervals (RTTI) are used to communication with an MS. RTTI are a modification to the above structure where, instead of a radio block being transmitted as four bursts with each block being sent in a particular timeslot over four TDMA frames, a radio block (containing essentially the same amount of information) is transmitted using two timeslots in two TDMA frames. This reduces the transmission time for a block and reduces the overall latency of the system. Accordingly, a "reduced radio block period" can be 2 TDMA frames (approximately 10 ms) compared with a basic radio block period, which can be 4 TDMA frames (approximately 20 ms).

In EGPRS systems, a radio block containing RLC data comprises a header and one or more RLC data blocks. The header (which is relatively robustly encoded) may be successfully decoded independent of the failure or success of decoding the one or more RLC data blocks. The header indicates the sequence number(s) of the RLC data blocks and (for downlink blocks) indicates the identity of the intended recipient MS. Provided that the header was decoded correctly, each of the RLC data blocks may be either successfully or unsuccessfully decoded. For example, in attempting to decode a radio block containing 2 RLC data blocks, an MS may decode the header and one of the RLC data blocks successfully, but may fail to decode the other RLC data block.

In a network, uplink allocations can be signaled to an MS using an uplink state flag (USF), which is a number between 0 and 7 (inclusive) that is signaled in downlink radio blocks. As part of the MS's uplink assignment, the MS is informed of which USF(s) on which timeslot(s) indicate an uplink allocation for that MS. USFs are generally included in the headers of downlink blocks. In the case of RTTI, USFs may be coded across radio blocks across four TDMA frames, for example, in the same manner as downlink BTTI radio blocks are sent (e.g., "BTTI USF mode") or (using two timeslots) across two TDMA frames (e.g., "RTTI USF mode").

In some communication standards, there are "m" timeslots assigned for reception and "n" timeslots assigned for transmission. Thus, for a multislot class type 1 MS, there may be Min(m,n,2) reception and transmission timeslots with the same timeslot number. For a multislot class type 2 MS, there may be Min(m,n) reception and transmission timeslots with the same timeslot number. In the case of downlink dual carrier configurations, if timeslots with the same timeslot number are assigned on both channels, in calculating the value of m they may be counted as one timeslot. As a result, where both downlink and uplink timeslots are assigned, if assigned a single timeslot in one direction and one or more timeslots in the opposite direction, the timeslot number of the first timeslot may be the same as one of the timeslot(s) in the opposite direction. Similarly, if assigned two or more uplink timeslots and two or more downlink timeslots, at least two of the uplink and downlink timeslots may have a common timeslot number. As a result, in uplink+downlink assignments, the timeslots that may be monitored for USFs and downlink data blocks may be largely co-incident. In some networks, assignments and allocations are essentially under the control of the network (for example, the BSC).

During an ongoing packet data session, for example, an MS with an assigned downlink TBF (temporary block flow) can be required to monitor all downlink timeslots in the MS's assignment in case the network sends the MS data in any of the allocated downlink timeslots. Similarly, if an MS has an assigned uplink TBF, the MS may be required to monitor all timeslots on which the USF (uplink state flag) could be sent to dynamically allocate uplink resources. If an MS has both uplink and downlink TBFs, therefore, the MS must monitor as many relevant downlink timeslots as possible, taking into account any allocated uplink transmissions opportunities.

In the case that either the network or the MS has no data to send, and particularly when neither the network nor the MS has data to transmit, this monitoring activity results in significant wasted battery power in the MS. To minimize battery power consumption, the assigned resources (e.g., TBF) may be maintained, while the number of timeslots that the MS must monitor is reduced. This reduction in the number of timeslots being monitored can be referred to as DTR.

Using DTR, an MS (for example an MS operating in packet transfer mode (i.e. with assigned packet resources)) can reduce its battery consumption by reducing the set of timeslots that the MS monitors for downlink data and/or uplink allocations (as indicated by uplink state flags (USFs)). The MS may monitor only a single timeslot or, in RTTI, a single pair of timeslots per radio block period. As a result, the network may only transmit new data or USFs on timeslots that are actually monitored by the MS. Generally, for an MS in DTR, the transmission or reception of any new data (generally not retransmissions of previously transmitted data) causes the MS to leave DTR mode.

In various network configurations, there can be two particular mechanisms by which a network can cause an MS to enter DTR mode: option 1—by transmitting a PACKET UPLINK ACK/NACK (PUAN) control message containing DTR information to the MS, or option 2—by means of DTR information included within a Radio Link Control (RLC) data block transmitted to the MS.

In option 1, when a PUAN is used to instruct the MS to enter DTR, one of the conditions that should be met before the MS enters DTR is that no data block has been transmitted or received in the previous (max(BS_CV_MAX, 1)−1) block periods. Here, BS_CV_MAX may be a value indicative of the round trip time for data packets (e.g., packets sent on a Physical Downlink Channel (PDCH) or Packet Associated Control Channel (PACCH)) between the network (or that part of the network that processes data packets) and the MS. The value is made available by the network for use by connected MSs and may be broadcast in system information (SI), for example. A typical value of BS_CV_MAX is 6, corresponding to 6 radio block periods, or approximately 120 ms, for example.

BS_CV_MAX is a useful value as the MS can use the round trip time to determine whether Negative Acknowledgement (NACK) messages received from the network can safely be ignored. If, for example, a NACK that refers to a block that was very recently transmitted to the network by the MS is received from the network, the MS can use BS_CV_MAX to determine whether the NACK refers to the most recently transmitted block, or to a duplicate of the block that was transmitted earlier (such as when an MS retransmits a block to the network). If the most recent transmission of the block took place less than one round-trip time (i.e., BS_CV_MAX radio block periods) prior to reception of the NACK, then the NACK cannot refer to the most recently transmitted block because the network must have transmitted the NACK prior to receiving the most recent block (the NACK cannot be received in less time than BS_CV_MAX). Therefore, the NACK does not refer to the block that was most recently transmitted by the MS and the MS may choose to ignore the NACK because the network could have safely received the most recent transmission, which would make the NACK moot.

Generally, in the first option for causing the MS to enter DTR, the condition that no data block has been transmitted or received in the previous (max(BS_CV_MAX, 1)−1) block periods must be met at the time when the PUAN is received; if not, the DTR Information in the PUAN is ignored and the MS will not enter DTR.

In the second option, when using DTR information included within an RLC data block to cause the MS to enter DTR, the conditions for the MS entering DTR are 1) that any received poll has been responded to, 2) that V(R)=V(Q), and 3) that the block with sequence number V(R)−1 contain DTR information.

In this option, the parameters V(R), V(Q), V(N) relate to the RLC receive window in the MS that is associated with RLC data blocks. V(N) refers to an array of elements, each of which can take the value INVALID or RECEIVED. V(R) identifies the block sequence number (BSN) of the next expected block (i.e. one more than the highest BSN that has been seen or, in some cases, one higher than the highest BSN whose corresponding data block has been received correctly). V(Q) refers to the lowest BSN identifying a block that has not yet been received correctly. As such, when V(R)=V(Q), the next expected block is also the only one that has not yet been received correctly, meaning that all blocks with lower BSNs have been received correctly. As an example, in a particular block sequence, if an MS has received blocks 1, 2, 3, 4, 5, 9, and 12 of the sequence correctly, V(R)=13 (the next higher BSN after 12), and V(Q)=6 (the lowest BSN of a block that was not received correctly). Alternatively, if an MS has received blocks 1, 2, 3, 4, and 5 correctly, but block 6 was received with errors, V(R)=7 and V(Q)=6. Finally, if an MS has received blocks 1, 2, 3, 4, 5, and 6 correctly, then V(R)=V(Q)=7 (i.e., all blocks 1-6 have been received correctly).

When using DTR information included within a RLC data block to cause the MS to enter DTR, it may not be necessary that all three conditions be satisfied in any particular order. For example, an MS may first receive blocks 1, 2, 3, and 4, then receive block 7 containing DTR information, and then later receive blocks 5, and 6 (e.g. in response to a request for retransmission). At that end of that sequence, even though all blocks were not received in order and all conditions were not satisfied in order, the MS will enter DTR because V(Q)=V(R)=8, and the block with BSN=V(R)−1 (i.e. 7) contained DTR information (presuming the MS has responded to any pending polls).

Note that if the network should subsequently receive an acknowledgement of all blocks up to and including block 7 from the MS, the network can determine that the MS has entered DTR. To trigger such an acknowledgement, the network may poll the MS—polls are indicated by settings of bits (such as in the relative reserved block period (RRBP)/combined EGPRS supplementary polling (CESP) fields) in the header of radio blocks.

When using DTR information included within a RLC data block to cause the MS to enter DTR, Table 1 illustrates an example EGPRS downlink RLC data block for instructing an MS to enter DTR.

TABLE 1

| Bit | | | | | | | | |
|---|---|---|---|---|---|---|---|---|
| | | | | | | 2 | 1 | |
| | | | | | | FBI | E | |
| Bit | | | | | | | | |
| 8 | 7 | 6 | 5 | 4 | 3 | 2 | 1 | |
| Length indicator | | | | | | | E | Octet 1 (note) (optional) |
| . | | | | | | | . | . |
| . | | | | | | | . | . |
| Length indicator | | | | | | | E | Octet M (optional) |
| | | | | | | | | Octet M + 1 |
| RLC data | | | | | | | | . |
| | | | | | | | | . |
| | | | | | | | | Octet K-1 |
| spare | DTR Blks | | CI | | TN/PDCH-pair | | | Octet K (optional) |
| | | | | | | | | . |
| | | | | | | | | . |
| | | | | | | | | Octet N2-1 |
| | | | | | | | | Octet N2 |

Referring to Table 1, the carrier ID (CI) field contains a identification of the carrier that may be encoded as DTR_CI IE. The CI field can be used to indicate the carrier that the MS monitors when DTR is used. In that case, the timeslot or PDCH-pair to monitor on that carrier can be indicated with the TN/PDCH-pair field. The TN/PDCH-pair field may contain the timeslot number (BTTI configuration) or the PDCH-pair number (RTTI configuration) the MS monitors on the indicated carrier (CI field) when DTR is implemented. Finally, the DTR Blks field may indicate a subset of downlink radio blocks during which the MS monitors for USFs and/or downlink RLC data blocks when in DTR mode. In some cases, when causing an MS to enter DTR, in both options 1 and 2 described above, there may be a maximum reaction period permitted between the conditions for an MS to enter DTR being satisfied and the MS actually entering DTR. Also, there may be some situations where, though inefficient, the MS may be required to leave DTR only to, soon thereafter, reenter DTR when instructed by the network. Also, when entering DTR, the MS must consider other conditions, such as whether V(R)=V(Q). In some instances, such as when some received blocks have not been decoded correctly, this may also result in the MS inefficiently entering or refraining from or delaying entering DTR.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is another diagram illustrating communications between a mobile station and an associated network operating in accordance with the present disclosure.

FIG. 4 is a further diagram illustrating communications between a mobile station and an associated network operating in accordance with the present disclosure.

FIG. 5 is still another diagram illustrating communications between a mobile station and an associated network operating in accordance with the present disclosure.

FIG. 6 is yet another diagram illustrating communications between a mobile station and an associated network operating in accordance with the present disclosure.

DETAILED DESCRIPTION

Figure 1:
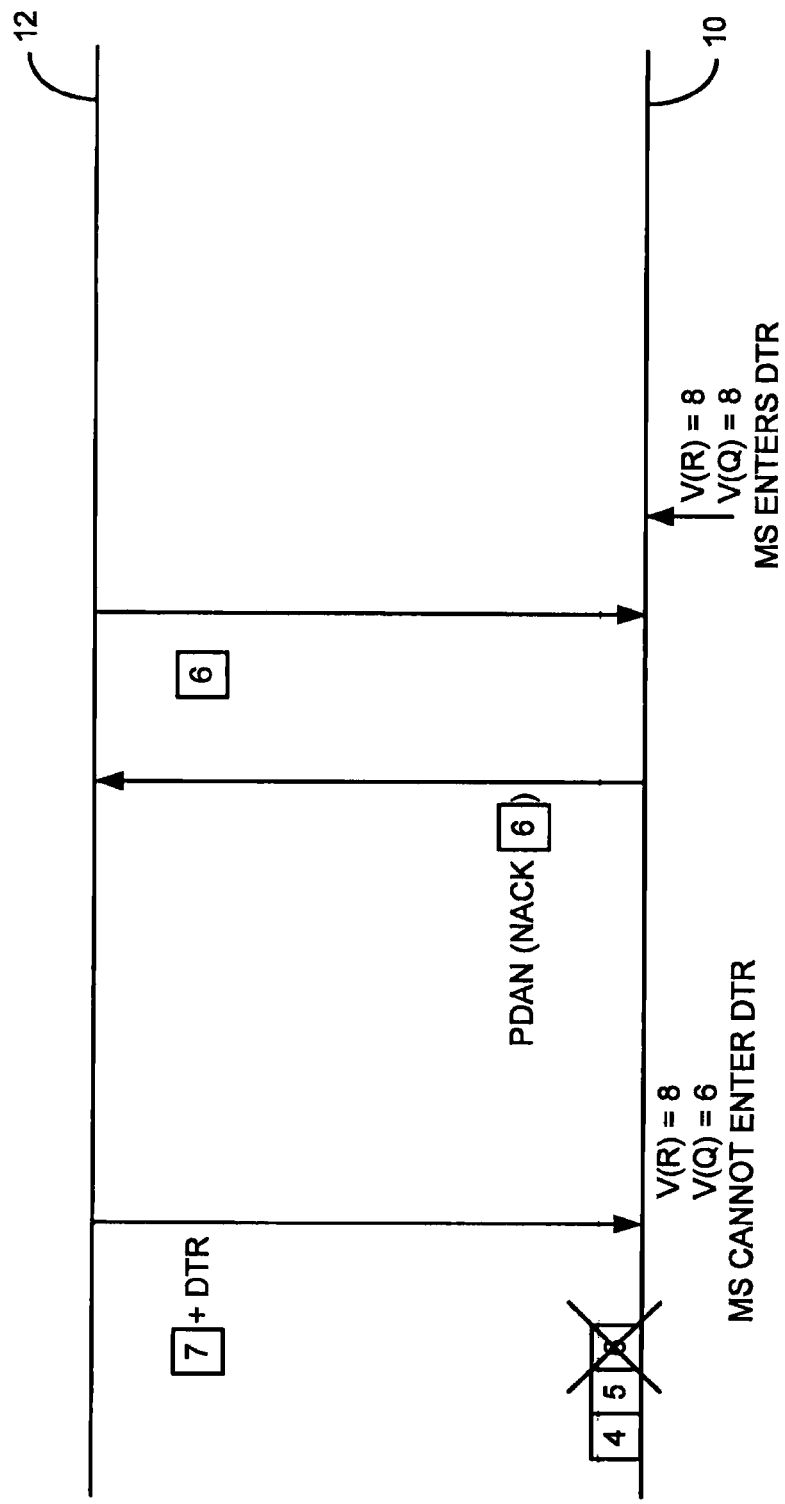
FIG. 1 is a diagram illustrating communications between a mobile station and an associated network that result in the mobile station entering DTR after some delay due to the content of an RLC data block not being received correctly.

The present disclosure provides a system and method for controlling Dynamic Timeslot Reduction (DTR) in a communications network by allowing the MS to remain in DTR mode if it receives "new data" meeting certain criteria. These criteria are designed so that, with high probability, the MS can distinguish between a block being sent to keep the MS in DTR and any other type of transmission where the network's intention is that the MS leave DTR mode, such as when transmitting large amounts of real "new data," for example, noting that if the amount of new data to be sent is very small, the consequences of mis-detection are limited.

The method may include a method for communicating with a network. The method includes receiving an assignment of first timeslots for uplink communications, and receiving a first data block having a first block sequence number and including an instruction to reduce monitoring to a set of timeslots. The set of timeslots has a number of timeslots less than a number of timeslots to be monitored in accordance with the assignment. The method includes determining that at least one second data block having a second block sequence number that is less than the first block sequence number was not successfully received from the network, reducing a number of timeslots monitored to the set of timeslots, and receiving a retransmission of the at least one second data block from the network using a timeslot in the set of timeslots.

Another embodiment includes a method for operating a network to communicate with an associated mobile station. The method includes transmitting an assignment of first timeslots for uplink communications, and transmitting an instruction to reduce monitoring to a set of timeslots. The set of timeslots has a number of timeslots less than a number of timeslots to be monitored in accordance with the assignment. The method includes retransmitting a subset of previously transmitted data blocks to the mobile station using a second set of timeslots. The second set of timeslots is a subset of the timeslots to be monitored in accordance with the assignment.

Another embodiment includes a method for operating a network to communicate with an associated mobile station. The method includes assigning a number of timeslots to the mobile station to monitor, transmitting an indication of a first subset of timeslots to be monitored by the mobile station with an associated first block sequence number, and awaiting a data block from the mobile station having an expected block sequence number less than or equal to the first associated block sequence number. The method includes transmitting data blocks to the mobile station with an associated second block sequence number greater than the first block sequence number.

Another embodiment includes a mobile station comprising a processor configured to receive an assignment of first timeslots for uplink communications, and receive a first data block having a first block sequence number and including an instruction to reduce monitoring to a set of timeslots. The set of timeslots has a number of timeslots less than a number of timeslots to be monitored in accordance with the assignment. The processor is configured to determine that at least one second data block having a second block sequence number that is less than the first block sequence number was not successfully received from the network, reduce a number of timeslots monitored to the set of timeslots, and receive a retransmission of the at least one second data block from the network using a timeslot in the set of timeslots.

Another embodiment includes a network component comprising a processor configured to transmit an assignment of first timeslots for uplink communications, and transmit an instruction to reduce monitoring to a set of timeslots. The set of timeslots has a number of timeslots less than a number of timeslots to be monitored in accordance with the assignment. The processor is configured to retransmit a subset of previously transmitted data blocks to the mobile station using a second set of timeslots. The second set of timeslots is a subset of the timeslots to be monitored in accordance with the assignment.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, channel, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring to FIG. 1, a diagram illustrating communications between an MS 10 and an associated network 12 is illustrated. Network 12 may include any appropriate network component, such as a component of a wireless communications network configured to communicate with an MS. As illustrated, the MS 10 has previously and correctly received block 4, and 5, but block 6 was not decoded correctly. Thereafter, the MS 10 receives block 7 and DTR information from the network 12. Accordingly, the MS 10 has a V(R) of 8 and a V(Q) of 6 and, thus, cannot enter DTR, despite receiving the DTR information from the network 12. The MS 10 sends a PDAN indicating a NACK for block 6. The network 12 subsequently retransmits block 6 (alternatively, not shown, the network may retransmit block 6 without having first received a NACK for block 6). Once block 6 is correctly received, the MS 10 has a V(R) of 8 and a V(Q) of 8 and finally enters DTR.

This situation described with respect to FIG. 1 is not fully battery efficient because, when instructed to enter DTR, the MS 10 could have received the missing data blocks in DTR, yet the MS 10 continues to monitor all assigned timeslots. The present disclosure recognizes that, when the MS is monitoring a reduced set of timeslots, this reduced set of timeslots nevertheless provides some bandwidth for transmission (or, more importantly, retransmission) of downlink data. This disclosure allows the MS to reduce the set of monitored timeslots even while it has not received all downlink RLC data blocks correctly, on the basis that the retransmissions of the incorrectly received data will take place using the DTR timeslots.

Figure 2:
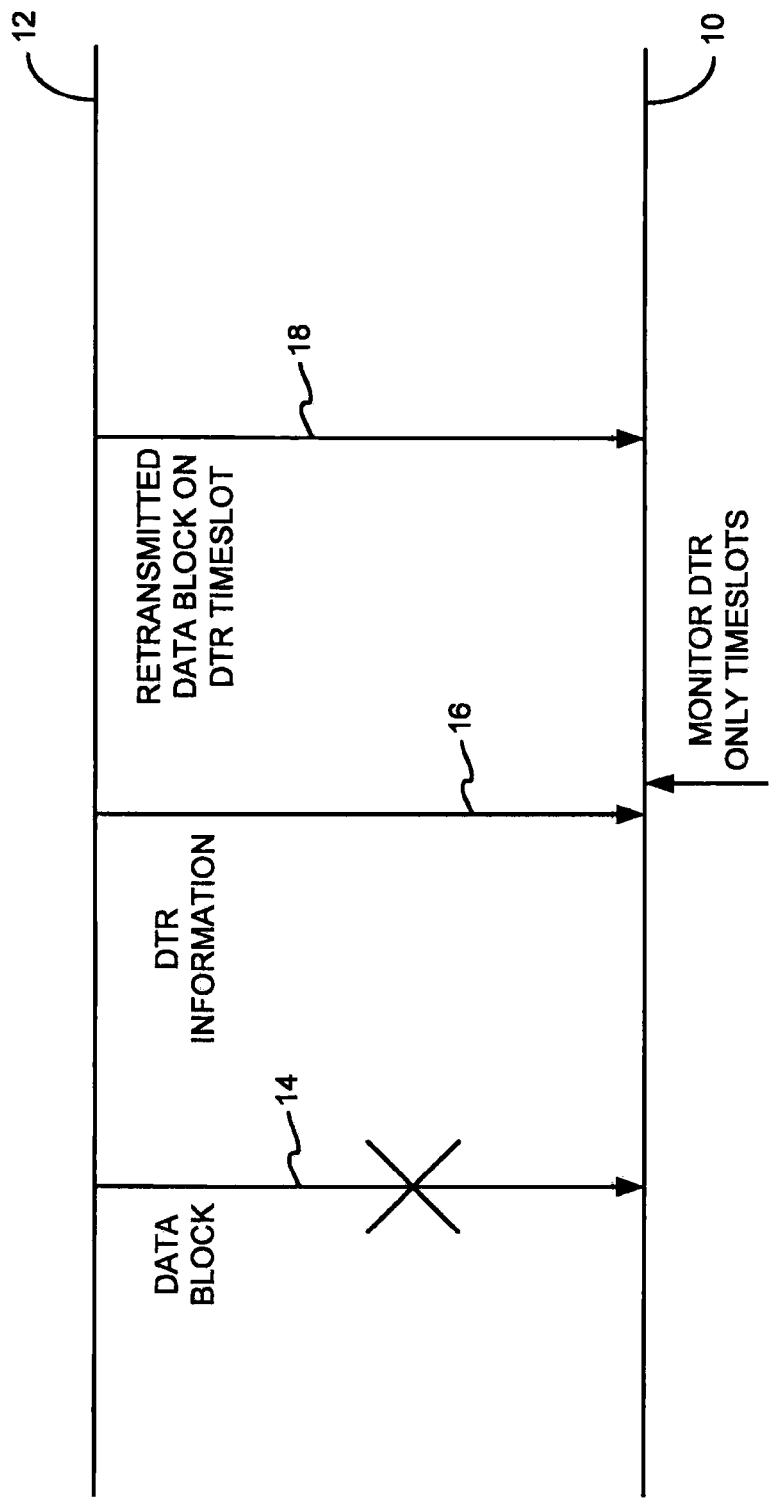
FIG. 2 is a diagram illustrating communications between a mobile station and an associated network operating in accordance with the present disclosure.

To illustrate these points, FIG. 2 is diagram a illustrating communications between a mobile station 10 and an associated network 12 operating in accordance with the present disclosure. In the illustrated diagram, a data block 14 is not received correctly by the MS 10. Thereafter, the MS 10 receives DTR information 16 from the network 16 and, accordingly, reduces the number of timeslots monitored to only include DTR timeslots. The network 12 then retransmits the data block that was not correctly received by the MS 10 on a DTR timeslot 18.

As will be described, in order to implement the above-described retransmission, in some cases, the network 12 needs to know which data blocks to retransmit. In some cases, the MS 10 may indicate which blocks need to be retransmitted, for example, by way of ACK/NACK information, and the network 12 therefore learns which blocks to retransmit on the DTR timeslot. In other cases, the set of blocks that the network 12 retransmits 18 on the DTR timeslot is deterministic. That is to say that the retransmission 18 is based on the sequence number of the blocks relative to the sequence number of the block containing DTR information. In some other cases, the network need not be able to determine which blocks need to be retransmitted but may pre-emptively (i.e. without explicit request in the form of ACK/NACK information) retransmit blocks which the mobile may not have received correctly.

Furthermore, as will be described, it is preferable that the MS 10 only enter DTR mode when it knows that the network 12 will retransmit the missing blocks on the DTR timeslot, such as, for example, by way of either one or both of the above mechanisms. Furthermore, it is preferable that the MS 10 only enter DTR mode when the impact on the delay in receiving the missing downlink blocks is below some threshold, or based on some restriction on the quantity or set of missing downlink blocks. In some cases, these two constraints may be considered broadly equivalent.

More particularly, the present disclosure specifies that the MS 10 may enter DTR if 1) it was not in DTR already, 2) all conditions for DTR are met (such as those described above as traditional predicates for entering DTR, as well as new conditions, not previously described, or any others) except V(R)=V(Q), 3) some pre-determined number/set of blocks are missing, and, optionally, the block containing DTR information also contained a poll requesting ACK/NACK information. In some cases, these conditions may be met in any order. In some cases, a restriction may apply on the order and/or relative times at which the conditions are met. An example of such restriction is that the MS 10 may enter DTR only if condition 3) is met immediately after receipt of and correct decoding of the block containing DTR Information.

The present disclosure applies in particular to the case where the network 12 orders the MS 10 into DTR by means of DTR Information within an RLC data block. However, the disclosure in general provides new criteria (specifically, based on the received set of data blocks and/or an explicit network indication that the MS 10 may enter DTR without having received all previously transmitted RLC data blocks) for determining whether and/or when an MS 10 shall enter DTR. In some cases these criteria may be combined with other criteria, such as those based on network to MS signalling.

The present disclosure applies in particular to the receive status of downlink RLC data blocks, in which case the limited downlink bandwidth available during DTR mode is used for retransmissions of these blocks; however, the principles described herein may also be applied to the receive status of uplink radio blocks, as indicated by the network to the mobile station by means of ACK/NACK signalling (including ACK/NACK control messages and piggy-backed ACK/NACK bitmaps), in which case the criteria that V(Q)=V(R) applies to the receive state array at the network 12.

It should be noted that the existing mechanism of ordering a MS into DTR mode by means of an appropriate indicator in a PUAN message is currently expected to be acted upon by the MS (i.e. the MS enters DTR immediately, or within the maximum reaction time) independent of the status of received downlink blocks (or the indicated status of received uplink blocks by the network). However, this approach cannot be used when there is no uplink TBF ongoing; furthermore, at the point where the NW 12 constructs the PUAN, it is not aware of what the up to date status of the receive state array of the MS 10 will be at the point when the MS 10 receives the PUAN and there is thus the risk that the MS 10 may enter DTR having an excessive number of unreceived downlink data blocks. Therefore, the approach described above, based on criteria which are applied by the MS, based on its receive state array at the time of meeting one or more other criteria for entering DTR (e.g. receiving a PUAN indicating DTR mode, receiving a downlink RLC data block containing DTR information) is preferable as it ensures that the MS enters DTR only when an appropriate number of downlink RLC data blocks are missing that can be retransmitted within a reasonable time limit using only the DTR timeslot(s) and can be applied independently of whether or not an uplink TBF is ongoing. Furthermore, a criteria for entering DTR which is evaluated by the MS 10 based on the indicated receive status of uplink RLC data blocks may be beneficial since i) this status may be indicated by means of a piggy-backed ACK/NACK bitmap, which may not include DTR information, ii) a PUAN may not have room (after including the necessary ACK/NACK information and other higher priority/mandatory information) to include DTR information, and iii) it may be preferable to simplify the implementation and/or specification of the existing DTR feature such that DTR information is never sent in a PUAN.

Addressing point 3) first and turning to FIGS. 3 and 4, a rule for a pre-determined number/set is preferably known to both the MS 10 and the network 12 so that the network can prioritize retransmissions of this set of blocks on the DTR timeslot(s). Preferably, this rule is deterministic (i.e. does not require any feedback from the MS 10) so that the network 12 can begin this prioritization substantially immediately (since the MS 10 may enter DTR mode immediately, even if some reaction time delay is permitted) after ordering the MS 10 enters into DTR, by means of pre-emptive retransmissions (i.e., re-transmissions without having received explicit indication from the MS 10 that these blocks are missing, or that the most recent transmissions of these blocks were received incorrectly).

As illustrated in FIG. 3, the pre-determined number/set may be designed to be tracked as a deterministic event, such as exactly one RLC data block. As will be described in detail, a deterministic event is an event where the MS 10 and network 12 are able to follow a set of rules for communicating with respect to DTR, without necessarily following common protocols and communications between the MS 10 and network 12. As will be described, by doing so, the MS 10 may be able to enter or remain in DTR despite receiving data blocks incorrectly.

As illustrated, data block 6 has not been received/decoded correctly, but the MS 10 enters DTR upon receipt of block 7 and the DTR information. Thereafter or concurrently, the network 12 pre-emptively retransmits block 6 on one of the DTR timeslots being monitored by the MS 10. For example, one RLC data block with BSN=V(R)−2 (i.e., the one before the one in which DTR information was included), is pre-emptively retransmitted by the network 12.

Turning to FIG. 4, other pre-determined number/set may be designed to be tracked as a deterministic events, such as a set of RLC data block(s) that were sent in a single radio block. As illustrated, data block 6 has not been received/decoded correctly, but the MS 10 enters DTR upon receipt of block 7 and the DTR information. There after, the network 12 pre-emptively retransmits in one or more radio blocks the set of RLC data blocks that were sent in the last radio block that have BSNs immediately preceding those in the radio block containing the DTR information. Accordingly, the MS 10 receives block 6 in the retransmission.

Beyond the deterministic rules-based protocols, examples of which are provided with respect to FIGS. 3 and 4, the rule may also allow for an arbitrary set, for example, limited in quantity, of RLC data block(s) to be outstanding. Specifically, as illustrated in FIG. 5, a rule may address (any) one RLC data block or, as illustrated in FIG. 6, a rule may address any set of RLC data blocks that were previously sent in one radio block or that could, if retransmitted, all be sent in the same radio block (optionally, using the same or a more robust encoding scheme than was originally used to transmit these RLC data blocks).

In these cases, when, in the case illustrated in FIG. 5, block 6 is not received properly or, in the case illustrated in FIG. 6, blocks 3 and 6 are not received properly, the MS 10 provides ACK/NACK information to the network 12 to allow the network 12 to schedule these RLC data block(s) on the DTR timeslot. Therefore, in these cases, the MS 10 should be provided with a means of providing this feedback, such as by a poll in the same radio block as the DTR information. In these cases, it may be preferable to include the condition that the block containing DTR information also contained a poll requesting ACK/NACK information.

However, in the cases illustrated in FIGS. 5 and 6, specification of and/or knowledge of the rules by both network 12 and MS 10 is not strictly necessary, since the network 12 knows how many RLC data blocks have not been previously ACK'ed by the MS 10 and it may further know (or be able to estimate) the probability of a successful transmission. Therefore, as an alternative to the above solutions, whereby there are restrictions on the set of missing RLC data blocks and which are known by network 12 and MS 10, the MS 10 may be permitted, for example, by means of explicit signalling within the downlink RLC data block containing the DTR Information, to enter DTR independent of the number or BSN(s) of missing blocks, provided that the DTR information has been received correctly. Preferably, the network 12 would indicate this permission based on the expected number of missing downlink blocks and/or the maximum set of downlink blocks which may be missing; preferably, the network indicates this permission when the expected number of missing downlink blocks and/or the maximum set of downlink blocks which may be missing is lower than a threshold.

It is noted, currently, that the DTR information may include an indication that, in DTR mode, only timeslots during some subset of block periods need to be monitored. In this case, according to an embodiment of the present solution, the MS 10 may instead enter a "partial DTR" where the MS 10 monitors the indicated timeslot(s), during all radio block periods. Then, when the complete (existing) conditions for entering DTR are met (including V(R)=V(Q)), the MS 10 switches to monitoring the DTR timeslot only during the subset of radio block periods. Though this operation may require the network 12 to limit the transmission of new data to the indicated subsets anyway (since it doesn't know whether the MS 10 is monitoring the full set or only the subset) while the MS 10 is monitoring the full set, the network 12 is able to take advantage of any 'uncertainty' period to retransmit blocks on timeslots that only MSs 10 that have not received all blocks will be monitoring.

In light of the foregoing, it can be seen that retransmissions of a limited quantity data can be done using a reduced set of timeslots (such as a single timeslot or, in the case of RTTI, a single pair of timeslots) after the DTR command/poll response is sent. Therefore, there may be limited or no benefit in the MS 10 monitoring more than this reduced set (e.g. one timeslot). Also, for rules/sets described above with respect to FIGS. 3 and 4, pre-emptive retransmissions (i.e. done before the network has received explicit indication that the MS did not receive the blocks) can be prioritized and sent on the DTR timeslot(s) so that there is no need for in the MS 10 to monitor additional timeslots.

Whether or not the MS 10 can enter DTR when there are missing blocks outstanding may be signalled by the network 12, for example by using one of the spare bits in the octet containing DTR information. In some embodiments, if the intention/desire of the network 12 is to get the MS 10 out of DTR because of the arrival of new information, it prioritizes data transmissions so that at least some of the new data (rather than retransmissions of old data) is sent on the DTR timeslot(s). By doing so, the network 12 instantly breaks the existing condition for entering DTR because a data block with a higher BSN than the block containing the DTR information has been received.

It should also be noted that the network 12 can assume that the MS 10 has received all downlink data blocks including the one including DTR information, and has therefore entered DTR immediately after receiving the DTR information (it does not know at this point whether the MS 10 has met the conditions for entering DTR. The reaction time is a minimum performance requirement ("no later than") and is not a delay imposed on the MS 10.

In many cases, there is no benefit to remaining out of DTR (in non-DTR mode) when only a few RLC data blocks are detected as missing/incorrectly received from the network. This disclosure allows faster entry of DTR than the existing specification in this scenario, resulting in improved battery consumption by the MS 10, with minimal impact on the network 12.

In addition, a mobile station not in DTR mode, upon reception of an RLC data block containing valid DTR information, shall enter DTR mode (i.e. shall start monitoring only the indicated PDCH or PDCH-pair (and if applicable, carrier) within the reaction time specified), if the RLC data block with BSN equal to V(R)−1 modulo SNS contained valid DTR information, V(Q)<V(R), and one or more of (according to the specific embodiment): i) only one element of V(N) within the receive window (but corresponding to a BSN less than V(R)) is not set to RECEIVED; ii) the only element of V(N) within the receive window (but corresponding to a BSN less than V(R)) not set to RECEIVED is that corresponding to V(R)−2; iii) the number of elements of V(N) within the receive window (but corresponding to a BSN less than V(R)) not set to RECEIVED is lower than or equal to the number of RLC data blocks sent within each of the radio blocks (or the minimum/maximum thereof if there are multiple such values) containing the RLC data blocks corresponding to the elements not set to RECEIVED; or iv) the RLC data block(s) whose corresponding elements in V(N) are not set to RECEIVED with sequence numbers less than V(R) were all initially transmitted in the same radio block (and, additionally in some embodiments, have BSN(s) adjacent to the lowest BSN of the RLC data blocks sent in the radio block containing the DTR information).

If the mobile station enters DTR mode while V(Q)<V(R), then it shall monitor the indicated timeslots in all radio blocks while V(Q)<V(R), independent of any indication that not all radio blocks are to be monitored while in DTR mode. If, while operating in this manner, V(R) becomes equal to V(Q), then the mobile station shall subsequently monitor the block periods as indicated by the DTR information.

In accordance with one embodiment, Table 1 listed above should be revised as follows.

TABLE 2

| Bit 2 | Bit 1 | | | | | | | |
|---|---|---|---|---|---|---|---|---|
| FBI | E | | | | | | | |

| Bit 8 | 7 | 6 | 5 | 4 | 3 | 2 | 1 | |
|---|---|---|---|---|---|---|---|---|
| Length indicator | | | | | | | E | Octet 1 (note) (optional) |
| . . . | | | | | | | | . . . |
| Length indicator | | | | | | | E | Octet M (optional) |
| RLC data | | | | | | | | Octet M + 1 . . . Octet K−1 |
| spare | AM | DTR Blks | | CI | TN/PDCH-pair | | | Octet K (optional) . . . Octet N2−1 Octet N2 |

The AM field indicates the DTR activation procedure the mobile station shall follow during a downlink TBF. Accordingly, the radio blocks monitored in DTR mode include:

TABLE 3

| AM bit 7 | Activation mode |
|---|---|
| 0 | Retransmission completed |
| 1 | Retransmission pending |

In this case, the network shall also indicate in the AM field of Table 2 (for more detail, see Table 3) whether the mobile station shall enter DTR mode during a downlink TBF either with pending retransmission of RLC data blocks (retransmission pending mode) or only with an empty RLC receive window (retransmission completed mode). During an uplink TBF only, the mobile station shall ignore the AM field.

If the mobile station receives an RLC data block containing valid DTR information indicating retransmission completed mode, then upon reception of an RLC data block resulting in an empty RLC receive window (i.e. V(R)=V(Q)), if the RLC data block with BSN equal to (R)−1 modulo SNS contained valid DTR information: a mobile station not already in DTR mode shall start monitoring only the indicated PDCH or PDCH-pair (and if applicable, carrier) within the reaction time specified for control messages and shall enter DTR mode; and a mobile station in DTR mode shall assume the DTR information is unchanged and shall therefore remain in DTR mode without attempting to confirm the status of DTR information (i.e. the network shall ensure the DTR information is kept unchanged for this MS while it remains in DTR mode.)

Upon reception of an RLC data block containing valid DTR information indicating retransmission pending mode: a mobile station not already in DTR mode shall start monitoring only the indicated PDCH or PDCH-pair (and if applicable, carrier) within the reaction time specified for control messages and shall enter DTR mode; and a mobile station in DTR mode shall assume the DTR information is unchanged and shall therefore remain in DTR mode without attempting to confirm the status of DTR information i.e. the network shall ensure the DTR information is kept unchanged for this MS while it remains in DTR mode.

Upon reception of an RLC data block containing valid DTR information indicating retransmission pending mode: a mobile station not already in DTR mode shall start monitoring only the indicated PDCH or PDCH-pair (and if applicable, carrier) within the reaction time specified for control messages and shall enter DTR mode; and a mobile station in DTR mode shall assume the DTR information is unchanged and shall therefore remain in DTR mode without attempting to confirm the status of DTR information i.e. the network shall ensure the DTR information is kept unchanged for this MS while it remains in DTR mode.

Figure 7:
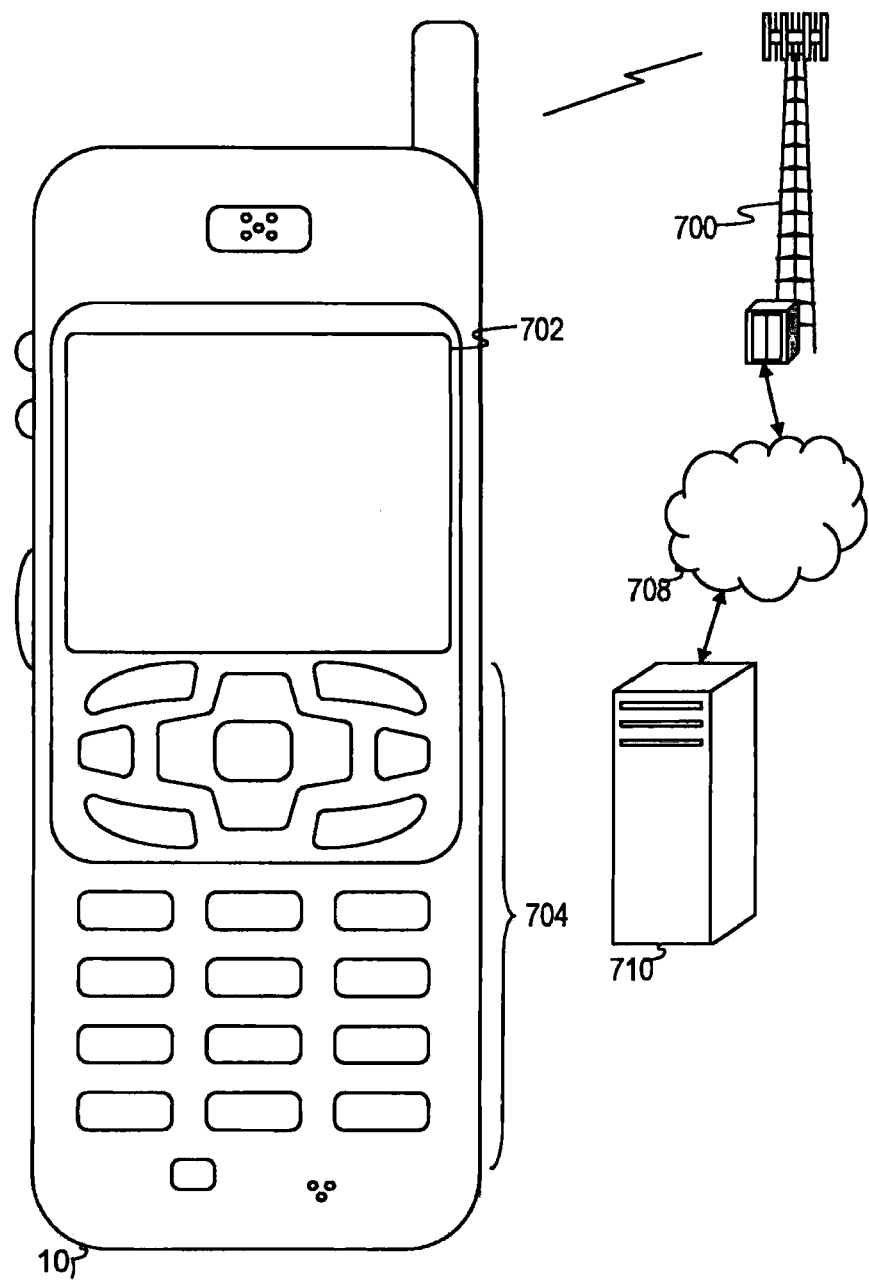
FIG. 7 is a diagram of a wireless communications system including a mobile station operable for some of the various embodiments of the disclosure.

Referring now to FIG. 7, a wireless communications system including an embodiment of an exemplary MS 10 is illustrated. The MS is operable for implementing aspects of the disclosure, but the disclosure should not be limited to these embodiments. Though illustrated as a mobile phone, the MS may take various forms including a wireless handset, a pager, a personal digital assistant (PDA), a portable computer, a tablet computer, a laptop computer, smart phones, printers, fax machines, televisions, set top boxes, and other video display devices, home audio equipment and other home entertainment systems, home monitoring and control systems (e.g., home monitoring, alarm systems and climate control systems), and enhanced home appliances such as computerized refrigerators. Many suitable devices combine some or all of these functions. In some embodiments of the disclosure, the MS 10 is not a general purpose computing device like a portable, laptop or tablet computer, but rather is a special-purpose communications device such as a mobile phone, a wireless handset, a pager, a PDA, or a telecommunications device installed in a vehicle. The MS 10 may also be a device, include a device, or be included in a device that has similar capabilities but that is not transportable, such as a desktop computer, a set-top box, or a network node. The MS 10 may support specialized activities such as gaming, inventory control, job control, and/or task management functions, and so on.

The MS 10 includes a display 702. The MS 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The MS 10 may present options for the user to select, controls for the user to actuate, and/or cursors or other indicators for the user to direct.

The MS 10 may further accept data entry from the user, including numbers to dial or various parameter values for configuring the operation of the MS 10. The MS 10 may further execute one or more software or firmware applications in response to user commands. These applications may configure the MS 10 to perform various customized functions in response to user interaction. Additionally, the MS 10 may be programmed and/or configured over-the-air, for example from a wireless base station, a wireless access point, or a peer MS 10.

Among the various applications executable by the MS 10 is a web browser, which enables the display 702 to show a web page. The web page may be obtained via wireless communications with a wireless network access node, a cell tower, a peer MS 10, or any other wireless communication network or system 700. The network 700 is coupled to a wired network 708, such as the Internet. Via the wireless link and the wired network, the MS 10 has access to information on various servers, such as a server 710. The server 710 may provide content that may be shown on the display 702. Alternately, the MS 10 may access the network 700 through a peer MS 10 acting as an intermediary, in a relay type or hop type of connection.

Figure 8:
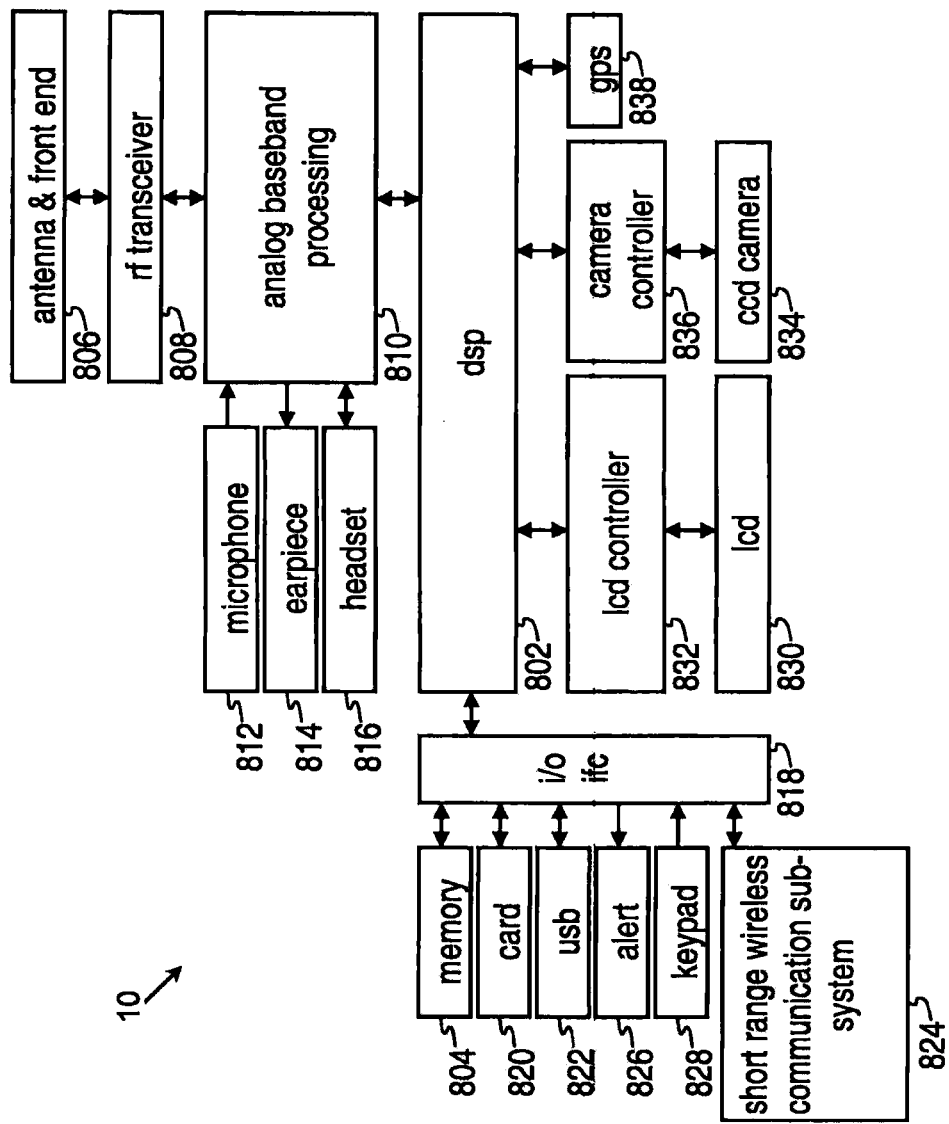
FIG. 8 is a block diagram of a mobile station operable for some of the various embodiments of the disclosure.

FIG. 8 shows a block diagram of the MS 10. While a variety of known components of UAs 10 are depicted, in an embodiment a subset of the listed components and/or additional components not listed may be included in the MS 10. The MS 10 includes a digital signal processor (DSP) 802 and a memory 804. As shown, the MS 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the MS 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the MS 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the MS 10 to send and receive information from a cellular network or some other available wireless communications network or from a peer MS 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 808, portions of the antenna and front end 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the MS 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the MS 10 and may also enable the MS 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the MS 10 to communicate wirelessly with other nearby mobile devices and/or wireless base stations.

The input/output interface 818 may further connect the DSP 802 to the alert 826 that, when triggered, causes the MS 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the MS 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the MS 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the MS 10 to determine its position. Various other peripherals may also be included to provide additional functions, e.g., radio and television reception.

Figure 9:
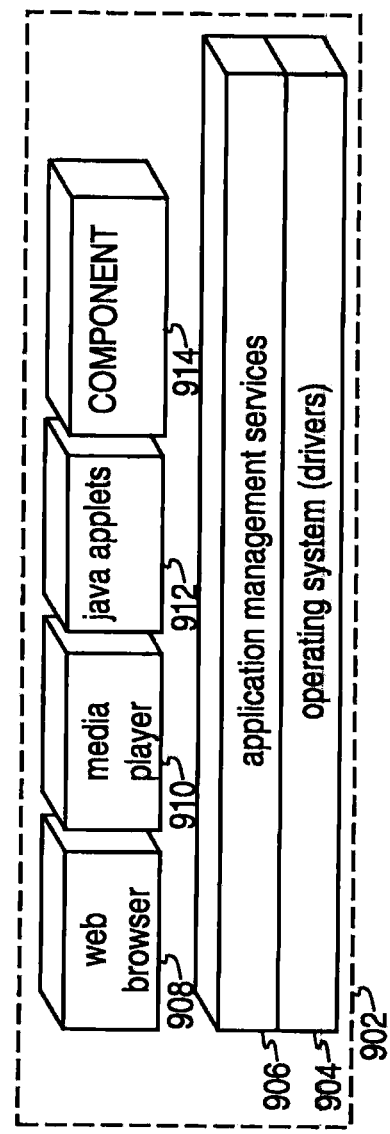
FIG. 9 is a diagram of a software environment that may be implemented on a mobile station operable for some of the various embodiments of the disclosure.

FIG. 9 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the MS 10. Also shown in the figure are a web browser application 908, a media player application 910, and Java applets 912. The web browser application 908 configures the MS 10 to operate as a web browser, allowing a user to enter information into forms and select links to retrieve and view web pages. The media player application 910 configures the MS 10 to retrieve and play audio or audio-visual media. The Java applets 912 configure the MS 10 to provide games, utilities, and other functionality. A component 914 might provide functionality described herein.

Figure 10:
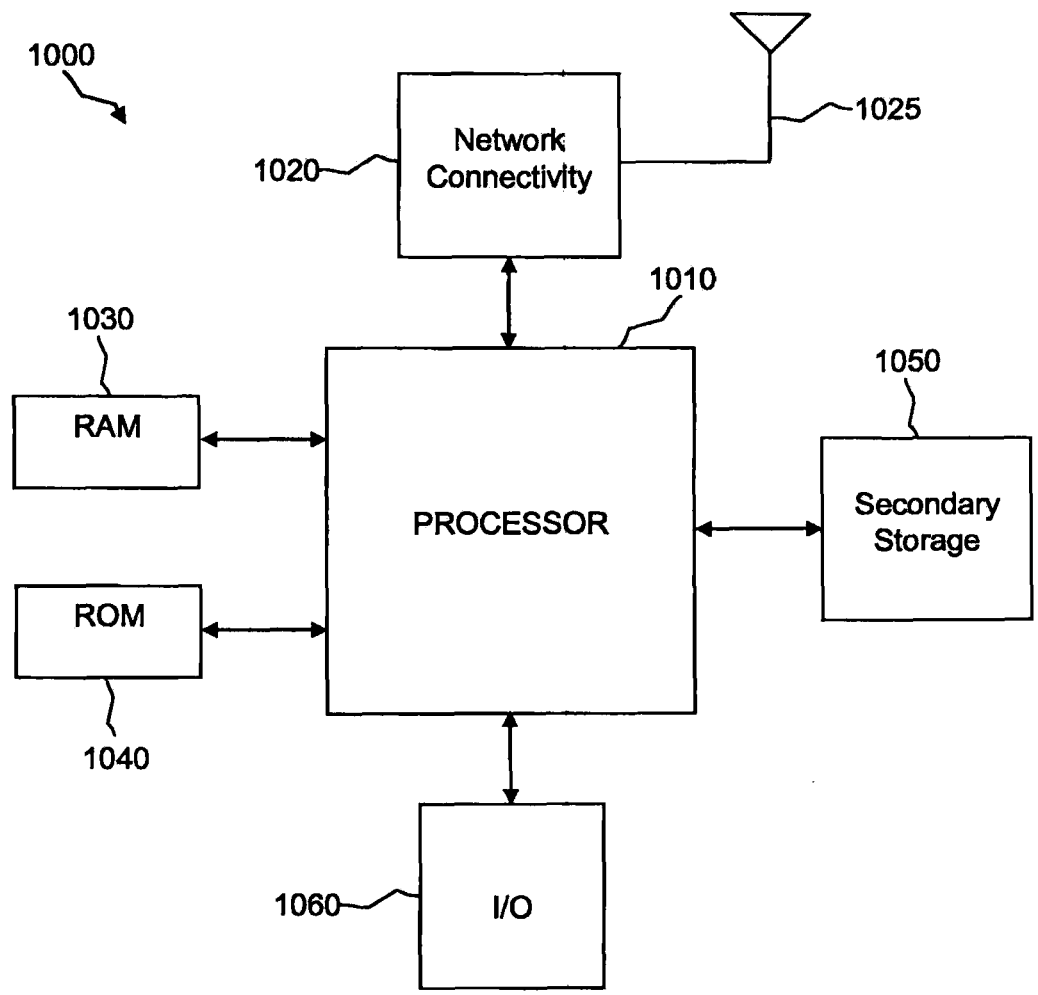
FIG. 10 is an illustrative general purpose computer system suitable for some of the various embodiments of the disclosure.

The MS 10, access device 120, and other components described above might include a processing component that is capable of executing instructions related to the actions described above. FIG. 10 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the MS 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communicating with a network, comprising:
receiving an assignment of first timeslots for uplink communications;
receiving a first data block having a first block sequence number and including an instruction to enter a dynamic timeslot reduction (DTR) mode by reducing monitoring to a set of timeslots, the set of timeslots having a number of timeslots less than a number of timeslots to be monitored in accordance with the assignment;
after receiving the first data block, determining that at least one second data block was not successfully received from the network, the second data block having a second block sequence number that is less than the first block sequence number;
entering the DTR mode even though the at least one second data block was not successfully received from the network by reducing a number of timeslots monitored to the set of timeslots; and
receiving a retransmission of the at least one second data block from the network while in DTR mode and using a timeslot in the set of timeslots.

2. The method of claim 1 wherein reducing the number of timeslots monitored is conditional on at least one of:
a number of blocks of the at least one second data block incorrectly received;
a variance of the second block sequence numbers of the at least one second data block relative to the first sequence number of the first data block;
a modulation and/or coding scheme (MCS) used to transmit the at least one second data block; and
a presence of a valid poll indication in the first radio block.

3. The method of claim 2 wherein reducing the number of timeslots being monitored is conditional on a number of the at least one second data block identified as being incorrectly received being less than or equal to a predetermined value.

4. The method of claim 3 wherein the predetermined value is dependent on a number of RLC data blocks that can be transmitted using an MCS used when receiving the at least one second data block.

5. The method of claim 3 wherein the predetermined value is equal to a number of RLC data blocks that can be transmitted in a single radio block.

6. A method for operating a network to communicate with an associated mobile station comprising:
transmitting an assignment of first timeslots for uplink communications;

transmitting data blocks to the mobile station;
transmitting an instruction to enter a dynamic timeslot reduction (DTR) mode by reducing monitoring to a second set of timeslots, the second set of timeslots having a number of timeslots less than a number of timeslots to be monitored in accordance with the assignment;
after transmitting the instruction to enter the DTR mode, determining that a subset of the previously transmitted data blocks were not successfully transmitted to the mobile station; and
retransmitting the subset of previously transmitted data blocks to the mobile station using the second set of timeslots.

7. The method of claim 6 wherein the subset of previously transmitted data blocks includes data blocks with a block sequence number one lower than a block sequence number of a data block containing the instruction to enter the DTR mode.

8. The method of claim 6 wherein the subset of previously transmitted data blocks includes data blocks sent in a radio block and wherein retransmitting includes transmitting a radio block.

9. The method of claim 6 including retransmitting another subset of data blocks using timeslots other than the second set of timeslots.

10. A mobile station, comprising:
a processor, the processor being configured to:
receive an assignment of first timeslots for uplink communications;
receive, from a network, a first data block having a first block sequence number and including an instruction to enter a dynamic timeslot reduction (DTR) mode by reducing monitoring to a set of timeslots, the set of timeslots having a number of timeslots less than a number of timeslots to be monitored in accordance with the assignment;
after receiving the first data block, determine that at least one second data block was not successfully received from the network, the second data block having a second block sequence number that is less than the first block sequence number;
entering the DTR mode even though the at least one second data block was not successfully received from the network by reducing a number of timeslots monitored to the set of timeslots; and
receive a retransmission of the at least one second data block from the network while in the DTR mode and using a timeslot in the set of timeslots.

11. The mobile station of claim 10 wherein the processor is configured to reduce the number of timeslots monitored based upon a condition including at least one of:

a number of blocks of the at least one second data block incorrectly received;
a variance of the second block sequence numbers of the at least one second data block relative to the first sequence number of the first data block;
a modulation and/or coding scheme (MCS) used to transmit the at least one second data block; and
a presence of a valid poll indication in the first radio block.

12. The mobile station of claim 11 wherein the processor is configured to reduce the number of timeslots monitored based upon a condition including a number of the at least one second data block identified as being incorrectly received being less than or equal to a predetermined value.

13. The mobile station of claim 12 wherein the predetermined value is dependent on a number of RLC data blocks that can be transmitted using an MCS used when receiving the at least one second data block.

14. The mobile station of claim 12 wherein the predetermined value is equal to a number of RLC data blocks that can be transmitted in a single radio block.

15. A network component, comprising:
a processor, the processor being configured to:
transmit an assignment of first timeslots for uplink communications;
transmit data blocks to a mobile station;
transmit an instruction to enter a dynamic timeslot reduction (DTR) mode by reducing monitoring to a second set of timeslots, the second set of timeslots having a number of timeslots less than a number of timeslots to be monitored in accordance with the assignment;
after transmitting the instruction to enter the DTR mode, determining that a subset of the previously transmitted data blocks were not successfully transmitted to the mobile station; and
retransmit the subset of previously transmitted data blocks to the mobile station using the second set of timeslots.

16. The network component of claim 15 wherein the subset of previously transmitted data blocks includes data blocks with a block sequence number one lower than a block sequence number of a data block containing the instruction to enter the DTR mode.

17. The network component of claim 15 wherein the subset of previously transmitted data blocks includes data blocks sent in a radio block and wherein retransmitting includes transmitting a radio block.

18. The network component of claim 15 wherein the processor is configured to retransmit another subset of data blocks using timeslots other than the second set of timeslots.

* * * * *